United States Patent
Cerny et al.

(10) Patent No.: US 6,394,252 B1
(45) Date of Patent: May 28, 2002

(54) ELECTROMAGNETICALLY ACTUATED POWER TRANSMITTING ASSEMBLY

(75) Inventors: Zdenek Cerny, Brampton; Ryszard Ostrowski, Mississauga; Peter Depikolozvane, Bolton; Norman Cerny, Brampton, all of (CA)

(73) Assignee: Tesma International Inc., Concord (CA)

( * ) Notice: Subject to any disclaimer, the term of this patent is extended or adjusted under 35 U.S.C. 154(b) by 0 days.

(21) Appl. No.: 09/691,844

(22) Filed: Oct. 18, 2000

Related U.S. Application Data

(60) Provisional application No. 60/159,640, filed on Oct. 18, 1999.

(51) Int. Cl.[7] ............................................. F16D 27/112
(52) U.S. Cl. .................. 192/84.961; 335/296; 29/602.1
(58) Field of Search .................... 192/84.961; 335/296; 29/602.1

(56) References Cited

U.S. PATENT DOCUMENTS

| | | |
|---|---|---|
| 2,729,318 A | 1/1956 | Harter |
| 2,796,962 A | 6/1957 | Pierce |
| 2,796,963 A | 6/1957 | Harter |
| 3,055,475 A | 9/1962 | Pitts, Jr. |
| 3,415,347 A | 12/1968 | Wrensch |
| 3,425,529 A | 2/1969 | Hayashi |
| 3,455,421 A | 7/1969 | Miller |
| 4,150,738 A | 4/1979 | Sayo et al. |
| 4,243,128 A * | 1/1981 | Shirai .......................... 192/35 |
| 4,296,851 A | 10/1981 | Pierce |
| 4,428,470 A * | 1/1984 | Bennett et al. ......... 192/110 B |
| 4,432,446 A | 2/1984 | Okano et al. |
| 4,547,757 A | 10/1985 | Yamada |
| 4,935,713 A | 6/1990 | Bekheet |
| 4,935,716 A | 6/1990 | Ehlmann |
| 5,036,964 A * | 8/1991 | Booth et al. ............. 192/109 R |
| 5,445,256 A | 8/1995 | Tabuchi et al. |
| 5,642,797 A * | 7/1997 | Wall ....................... 192/84.961 |
| 5,667,050 A | 9/1997 | Hasegawa |

FOREIGN PATENT DOCUMENTS

| | | |
|---|---|---|
| WO | WO 91/16551 | 10/1991 |

OTHER PUBLICATIONS

Copy of the PCT Search Report issued in the corresponding PCT Application No. PCT/CA00/01239.

* cited by examiner

Primary Examiner—Richard M. Lorence
(74) Attorney, Agent, or Firm—Pillsbury Winthrop LLP

(57) ABSTRACT

An electromagnetically actuated power transmitting assembly has a cup shaped pulley structure mounted for rotation about the input shaft of a power driven device. The pulley structure has an outer annular driven portion for engaging an endless flexible driving element such that engine driven movement of the driving element rotates the pulley structure. The outer annular portion has ferromagnetic material along at least an internal diametrical periphery thereof to allow magnetic flux to flow therethrough. A one-piece flux carrier/mounting structure is formed from ferromagnetic material and has a mounting portion fixedly mounted to the power driven device and an annular flux carrier portion nested within the cup shaped pulley structure to allow the pulley structure to rotate relative to the flux carrier and to allow magnetic flux to flow therebetween. An annular magnetic coil for inducing a field of magnetic flux is fixedly mounted in the carrier portion. A selectively movable clutch has a magnetically attractable disc portion and a biasing member biasing the disc portion to a disengaged position. The clutch is mounted such that energizing the coil induces a magnetic flux which overcomes the bias and selectively moves the disc portion from the disengaged position to an engaged position wherein the clutch couples the pulley structure and the input shaft for rotation. De-energizing the coil enables the biasing member to move the disc portion to the disengaged position de-coupling the pulley structure the input shaft to allow the pulley structure to rotate relative thereto.

13 Claims, 5 Drawing Sheets

ELECTROMAGNETICALLY ACTUATED POWER TRANSMITTING ASSEMBLY

This application claims the benefit of U.S. Provisional Application No. 60/159,640, filed Oct. 18, 1999.

FIELD OF THE INVENTION

The present invention relates to an electromagnetically actuated power transmitting assembly for selective transmission of power to the power driven device from vehicle's engine system via a pulley driven by an endless flexible driving element, such as a driving belt.

BACKGROUND OF THE INVENTION

U.S. Pat. No. 5,667,050 discloses an example of a conventional electromagnetic power transmitting assembly. The assembly illustrated in the '050 patent is of the type that is used with an air conditioning compressor in a motor vehicle. The assembly of the '050 patent has a pulley structure that rotates on a ball bearing assembly about the input shaft of the compressor. The pulley structure has a grooved outer periphery that engages with a flexible endless belt which is driven by the vehicle's engine system. The power transmitting assembly of the '050 patent also has a magnetic coil that induces a field of magnetic flux when energized by electricity supplied from a clutch controller. A ferromagnetic clutch plate is carried by the pulley structure for rotation therewith and an axially movable clutch disc is mounted on the input shaft. The clutch disc is selectively movable in an axial direction between (a) an engaged position wherein the plate and the disc are coupled together to transmit rotation from the rotating pulley structure to the input shaft, thereby supplying power to the compressor, and (b) a disengaged position wherein the clutch disc is de-coupled from the clutch plate to disconnect the pulley structure from the input shaft.

In order to increase or decrease the diameter of the pulley structure in the type of electromagnetic coupling apparatus disclosed in the '050 patent, there are several methods that can be used. The procedure of decreasing the diameter of the pulley structure without simultaneously decreasing the diameter of the electromagnetic housing must be carried out cautiously with regards to maintaining the limits of adequate thickness within the pulley outer annular portion which includes the grooved surface. The thickness in that portion of the pulley structure is limited by the required structural integrity under the belt load, and the capability to carry the magnetic flux without exceeding the magnetic flux saturation limit. Should the required decrease in diameter of the pulley structure exceed the above mentioned limits then the coil cavity inside diameter (also called a coil hollow or a coil trepan) must also be decreased. Such change involves costly and time consuming changes in production tooling including new coil winding, coil housing and related components.

The procedure of increasing the diameter of the pulley structure by a relatively small increment usually includes the addition of material to the pulley outer periphery. It should be obvious, however, that any increase in the diameter of the pulley outer annular portion without a simultaneous (and costly) increase in the inside diameter of the coil cavity results in greater thickness of the pulley outer annular portion. That, in turn, results in increased inertia and increased production costs.

Furthermore, if the pulley outer diameter must be increased by a large increment and beyond the limits of the thickness range of the pulley outer annular portion, there are at least two prior methods that can be used. One method offers the option to increase the diameter of both the pulley outer periphery as well as the coil cavity. It should be understood that the thickness in the pulley outer annular portion in the type of the pulley structure used in the disclosure of the '050 patent may be optimized for the required magnetic flux density. In most applications of the type of electromagnetic coupling apparatus disclosed in the '050 patent the minimum thickness of the pulley outer annular portion required to satisfy the magnetic flux carrying capability is usually sufficient to support the bending and torsional stresses under the driving belt load. Nevertheless, this method of increasing the diameter of the pulley outer periphery while simultaneously increasing the inside diameter of the coil cavity presents the need for a complete re-tooling of the electromagnetic housing assembly including the coil winding, coil housing and the related coil retaining components. This is a relatively very expensive change, also requiring the engineering and manufacturing expertise to accomplish it.

Another option to increase the diameter of the pulley outer periphery by a large increment is to add an annular flux carrier 38 as disclosed in U.S. Pat. No. 4,935,713. This ring-shaped component is usually die-formed into the desirable shape and then attached to the pulley structure by welding. The original inside diameter of the coil cavity is maintained in order to utilize the existing electromagnetic housing and avoid the costly re-tooling. The procedure of increasing the diameter of the pulley outer periphery is then carried out at a nominal cost.

Another similar method of increasing the diameter of the pulley outer periphery by a large increment without simultaneously increasing the inside diameter of the coil cavity and consequently the diameter of the electromagnetic housing is shown in U.S. Pat. No. 5,445,256. This method involves the forming of the magnetic flux frame into a U-shape whereby the original inside diameter of the coil cavity is maintained and the costly re-tooling of the electromagnetic housing is avoided. The procedure of increasing the outer periphery of the pulley structure which is attached to the U-shaped frame by various methods, usually by laser or electron-beam welding, is carried out at a nominal cost.

The arrangements of the '713 and the '256 patents, however, still has shortcomings that it would be desirable to eliminate. The main problem with the arrangement of these patents is that the structure responsible for carrying the flux rotates along with the pulley structure and therefore adds to the rotational inertia of the system and detracts from the power transmitting assembly's overall power transferring efficiency. Further, the rotating flux carrying structures in these patents adds another component to the assembly. This in turn increases component costs and adds extra steps to the manufacturing process.

U.S. Pat. No. 3,455,421 discloses an arrangement wherein a U-shaped metal member is attached to the rear face of the coil and with one leg thereof disposed adjacent the inner diametrical periphery of the pulley's driven portion. The magnetic flux induced by the coil flows radially through this metal member and through the internal periphery of the driven portion to the face of the pulley structure to affect movement of the clutch member. The pulley structure rotates relative to both the coil and this U-shaped member. Thus, the U-shaped member does not add to the overall rotational inertia of the power transmitting assembly, but does function to bridge the spacing between the coil and the pulley structure's driven portion.

The power transmitting assembly of the '421 patent, however, has extra components and requires extra assembly steps both of which it would be desirable to eliminate. In particular, the power transmitting assembly of the '421 patent has a separate mounting structure that is constructed and arranged to be mounted to the compressor housing and the U-shaped member is formed separately and mounted to that mounting structure.

Consequently, there exists a need in the art for an improved power transmitting assembly in which radial spacing is provided between the magnetic coil and the pulley structure thereof and wherein the radial spacing is effectively bridged to ensure the necessary flow of magnetic flux without unnecessarily adding to the rotational inertia of the power transmitting assembly. Further, it would be desirable to accomplish this with fewer components than used in the prior art arrangements discussed above.

SUMMARY OF THE INVENTION

It is an object of the present invention to provide an electromagnetically actuated power transmitting assembly for installation on a power driven device of a motor vehicle to selectively supply power from the vehicle's engine system to the power driven device via an endless flexible driving element driven by the engine system. The power driven device is of the type having a rotatable input shaft that is selectively rotatable to supply power to the device. The power transmitting assembly comprises a rotatable pulley structure constructed and arranged to be mounted for rotation about the input shaft of the power driven device. The pulley structure provides an annular driven portion constructed and arranged to be engaged with the endless flexible driving element such that engine driven movement of the driving element rotates the pulley structure. The pulley structure comprises ferromagnetic material provided along at least an internal diametrical periphery of the driven portion to allow magnetic flux to flow through the driven portion.

A one-piece flux carrier/mounting structure is formed from ferromagnetic material. The flux carrier/mounting structure comprises an integrally formed mounting structure fixedly mounted to the power driven device and an integrally formed flux carrier portion. An annular magnetic coil is adapted to induce a field of magnetic flux. The coil is fixedly mounted to the mounting structure such that the mounting structure fixedly mounts the coil about the input shaft with the coil spaced radially inwardly from the internal diametrical periphery of the pulley structure driven portion, and the flux carrier portion extending generally radially between the internal diametrical periphery of the pulley structure driven portion and the coil but spaced sufficiently from the internal diametrical periphery to enable the flux field induced by the coil to flow generally radially between the coil and the internal diametrical periphery of the pulley structure driven portion and to allow the pulley structure to rotate relative to both the flux carrier/mounting structure and the coil.

A selectively movable clutch member comprises an attraction portion formed from ferromagnetic material. The clutch member is mounted in power transmitting relation to the input shaft such that rotating the clutch member rotates the input shaft to supply power to the power driven device. The clutch member is positioned such that the magnetic flux flowing through the bridge portion to the flux carrying portion magnetically attracts the attraction portion of the clutch member to selectively move the clutch member between a disengaged position wherein the clutch member de-couples the pulley structure from the input shaft to allow the pulley structure to rotate relative to the input shaft and an engaged position wherein the clutch member couples the pulley structure and the input shaft so that rotation of the pulley structure under engine driven movement of the endless flexible driving element rotates the clutch member, which in turn rotates the input shaft device to thereby supply power to the power driven device.

Another aspect of the present invention provides a method for making a plurality of pulley assemblies of the type described above. This method comprises:

providing a coil inventory of the stationary annular magnetic coils, each of the coils of the coil inventory being substantially identical;

providing a first pulley structure inventory of first pulley structures, the annular driven portions of the first pulley structures each having a first outer diameter at a driving element engaging surface thereof and a first inner diameter at the inner diametrical periphery thereof;

providing a second pulley structure inventory of second pulley structures, the annular driven portions of the second pulley structures each having a second outer diameter at a driving element engaging surface thereof different from the first outer diameter and a second inner diameter at the inner diametrical periphery thereof different from the first inner diameter;

providing a first flux carrier/mounting structure inventory of first stationary one-piece flux carrier/mounting structures each formed from ferromagnetic material, the first flux carrier/mounting structures each comprising an integrally formed mounting portion constructed and arranged to be fixedly mounted to the power driven device and an integrally formed flux carrier portion having a first radial extent selected to extend generally radially between the internal diametrical periphery of the annular driven portion of an associated first pulley structure and an associated coil to enable the flux field induced by the associated coil to flow generally radially between the associated coil and the internal diametrical periphery of the driven portion of the associated first pulley structure and to allow the associated first pulley structure to rotate relative to both its associated first flux carrier/mounting structure and the associated coil;

providing a second flux carrier/mounting structure inventory of second stationary one-piece flux carrier/mounting structures each formed from ferromagnetic material, the second flux carrier/mounting structures each comprising a mounting portion constructed and arranged to be fixedly mounted to the power driven device and a flux carrier portion having a second radial extent selected to extend generally radially between the internal diametrical periphery of the annular driven portion of an associated second pulley structure and an associated coil to enable the flux field induced by the associated coil to flow generally radially between the associated coil and the internal diametrical periphery of the driven portion of the associated second pulley structure to rotate relative to both its associated second flux carrier/mounting structure and the associated coil;

providing a clutch member inventory of selectively movable clutch members;

fixedly mounting a coil from the coil inventory to a first flux carrier/mounting structure from the first flux carrier/mounting structure inventory;

assembling a first power transmitting assembly package including a first pulley structure from the first pulley structure inventory, the first one-piece flux carrier/mounting structure with the coil from the coil inventory fixedly mounted thereto, and a selectively movable clutch member from the clutch member inventory;

delivering the first power transmitting assembly package;

mounting a coil from the coil inventory to a second flux carrier/mounting structure from the second flux carrier/mounting structure inventory;

assembling a second power transmitting assembly package including a second pulley structure from the second pulley structure inventory, the second one-piece flux carrier/mounting structure from the second flux carrier/mounting structure inventory with the coil from the coil inventory fixedly mounted thereto, and a selectively movable clutch member from the clutch member inventory;

delivering the second power transmitting assembly package.

In accordance with this method, pulley assemblies having pulley structures with driven portions of varying outer and inner diameters can be made using a single inventory of substantially identical magnetic coils.

Other objects, features, and advantages of the present invention will become apparent from the following detailed description, the accompanying drawings, and the appended claims.

DETAILED DESCRIPTION OF THE PREFERRED EMBODIMENT OF THE INVENTION

Figure 1:
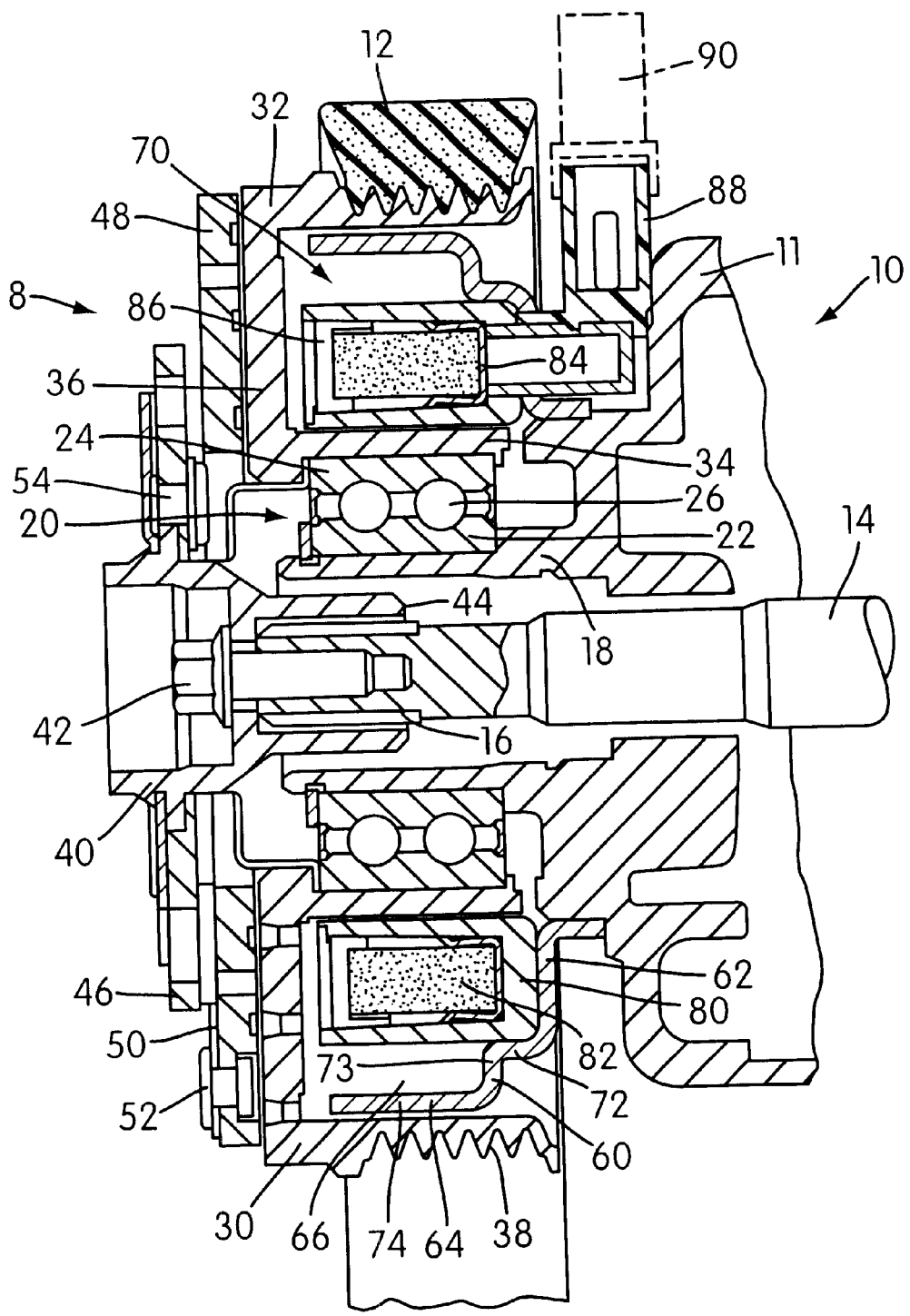
FIG. 1 is a cross-sectional view of an electromagnetically actuated power transmitting assembly constructed in accordance with the principles of the present invention, the power transmitting assembly being installed on the air conditioning compressor of a motor vehicle.

FIG. 1 shows a power transmitting assembly, generally indicated at 8, mounted on a power driven device. The power transmitting assembly 8 is constructed in accordance with the principles of the present invention. The power driven device illustrated is the air conditioning compressor 10 of a motor vehicle, but the power transmitting assembly 8 of the present invention may be used with any type of device or accessory that draws power from the vehicle's engine system (not shown) by an endless flexible driving element, such as drive belt 12 or an endless chain (not shown).

The compressor 10 has a housing 11 that contains the compressor's operative components. An input shaft 14 extends outwardly from an opening formed in the housing 11 and connects to the operative components of the compressor 10 such that rotation of the shaft 14 supplies power to the compressor's operative components. The forward end of the input shaft 14 has a series of axially extending splines 16 formed thereon. The particular construction of the compressor is well-known in the art and is not detailed herein.

An outwardly extending tubular mounting structure 18 extends forwardly from the housing 11 and provides the opening through which the shaft 14 extends. The forward end portion of the mounting structure 18 is necked down and an annular ball bearing assembly 20 is received on the necked down portion. The ball bearing assembly 20 comprises an annular inner race 22 constructed and arranged to be fixedly mounted on the necked down portion, an annular outer race 24 surrounding the inner race 22, and a plurality of ball bearings 26 disposed therebetween that enable smooth relative rotation between the races 22, 24.

A cup shaped pulley structure 30 is fixedly mounted to the exterior of the outer race 24. The pulley structure 30 illustrated is a one-piece structure formed from ferromagnetic material, preferably low carbon steel. The pulley structure 30 provides an annular radially outer wall 32, an annular radially inner wall 34, and an annular clutch plate wall 36 interconnecting walls 32, 34. The outer wall 32 defines an annular driven portion that has a plurality of grooves 38 extending circumferentially around the periphery thereof to facilitate frictional engagement between the outer wall 32 and the belt 12. The annular driven portion 32 has a sufficient thickness and structural integrity to withstand the torsional and radial loads applied by the driving element 12 with little or no deformation. The inner wall 34 is constructed and arranged to fit tightly in force fit relation on the outer race 24 of the ball bearing assembly 20. This arrangement enables the pulley structure 30 to rotate relative to the compressor 10 about its input shaft 14.

The illustrated pulley structure 30 is a one-piece structure formed from ferromagnetic material. Alternatively, the pulley structure 30 could be formed from a non-ferromagnetic material, such as a high strength plastic, and a ferromagnetic sleeve could be mounted along the internal diametrical periphery of the driven portion 32. Either way, the pulley structure's driven portion 32 will be considered to have ferromagnetic material provided along the internal diametrical periphery thereof A clutch hub 40 is constructed and arranged to be fixedly mounted to the end of the input shaft 14 via a threaded bolt 42. The clutch hub 40 has a series of axially extending splines 44 that mate with the splines 16 on the input shaft 14 in an intermeshed relationship. This mating ensures that rotating the clutch hub 40 in turn rotates the input shaft 14, which in turn supplies power to the compressor 10.

The hub 40 has an annular plate 46 fixedly mounted to the clutch hub 40 by swaging metal material from the hub 40 into recesses on the plate 46. A selectively movable clutch member in the form of an annular clutch disc 48 is mounted on the clutch hub 40 between the plate 46 and the clutch plate 36 of the pulley structure 30. The plate 46 and the disc 48 are interconnected by a series of three tensioned elastomeric straps 50. The straps 50 are fixed at one end to rivets 52 on the disc 48 and at the other end to rivets 54 on the plate 46.

The clutch member and the way in which it is mounted is not particularly important to the invention and may have any suitable construction.

The clutch disc 48 moves axially relative to the hub 40 between an engaged position and a disengaged position. In the engaged position, the disc 48 frictionally engages the axial face of the pulley structure's clutch plate 36. As a result, the pulley structure 30 is coupled to the input shaft 14 so that rotation of the pulley structure 30 under engine driven movement of the belt 12 rotates the shaft 14 to supply power to the compressor's operative components. In the illustrated embodiment, the pulley structure 30 is coupled to the input shaft 14 via the frictional engagement between clutch disc 48 and plate 36, the straps 50 interconnecting the disc 48 and the plate 46 fixed to the clutch hub 40, and the mated splines 16, 44 on the shaft 14 and the hub 40, respectively.

In the disengaged position, the clutch disc 48 is spaced from clutch plate 36 so that the pulley structure 30 is de-coupled from the input shaft 14. As a result, the pulley structure 30 rotates freely relative to the shaft 14. The straps 50 bias the clutch disc 48 towards the disengaged position so as to normally maintain it in that position.

An annular flux carrier/mounting structure 60 is constructed and arranged to be fixedly mounted to the compressor housing 11 about the shaft 14. The flux carrier/mounting structure 60 is stamped as a one-piece part from a single sheet metal blank. The carrier/structure 60 has an integrally formed annular mounting portion 62 that fixedly mounts to the compressor housing 11 and an integrally formed annular flux carrier portion 64 that extends into the annular cavity 66 defined between the inner and outer walls of the pulley structure 30. The carrier/mounting structure 60 is formed as one part to reduce componentry/assembly steps and save costs. The flux carrier portion 64 includes a radially inner portion 72, a radially outer portion 74, and an intermediate flux bridge portion 73 that extends generally radially between the radially inner and outer portions 72, 74.

The configuration of the carrier/mounting structure 60 is not critical and may take any shape or form so long as it has some radial dimension or thickness (i.e., radial extent) that extends generally radially between the internal diametrical periphery of the pulley structure driven portion 32 and the coil 70 but is spaced sufficiently from the internal diametrical periphery to enable the flux field induced by the coil 70 to flow generally radially between the coil 70 and the internal diametrical periphery of the pulley structure driven portion 32 and to allow the pulley structure 30 to rotate relative to both the flux carrier/mounting structure 60 and the coil 70.

An annular magnetic coil 70 is fixedly mounted to the carrier/mounting member 60 via welding or the like and sits within the cavity 66 of the pulley structure 30 when the assembly 8 is assembled. The coil 70 is positioned so that the radially outer periphery thereof contacts or is in proximity to radially inner portion 72 of the flux carrier portion 64 and the inner radial periphery thereof is spaced slightly from the pulley structure's inner wall 34. This slight spacing or radial clearance allows the pulley structure 30 to rotate relative to the stationary coil 70 without frictional build-up therebetween.

When the power transmitting assembly is installed with the coil 70 and carrier/mounting structure 60 fixed to the housing 11, the pulley structure 30 mounted on the outer race 24 of the ball bearing assembly 20 and the inner race 22 of the ball bearing assembly 20 fixedly mounted to the compressor 10, a radially outer portion 74 of the flux carrier portion 64 is spaced slightly from the internal diametrical periphery of the outer wall 32 of the pulley structure 30 as determined by the radial extent of the flux carrier portion 64. This spacing permits the pulley structure 30 to rotate relative to the stationary carrier/mounting member 60 without building up friction therebetween. This spacing, however, is sufficiently small enough to allow magnetic flux to travel between portion 74 and the internal diametrical periphery of the pulley structure 30.

The magnetic coil 70 comprises an annular coil housing 80 that has a length of electroconductive wiring 82 wound up inside it. The length of wiring 82 is held together by a bobbin 84 on the inside of the housing 80 and resin 86 is applied over the wiring 82 at the outside of the housing 80 and solidified to secure the wiring in place.

The ends of the wiring 82 pass through an opening in the carrier/mounting member 60 and connect to a receptacle 88. The receptacle 88 receives a plug 90 that supplies electricity from a clutch controller (not shown). When electricity is supplied to the wiring 82 via the receptacle 88 and the plug 90, the coil 70 becomes energized and induces a field of magnetic flux. The flux carrier portion 64 of carrier/structure 60 allows the magnetic flux to travel or flow across the radial spacing provided between the coil 70 and the internal diameter periphery of the outer wall 32 of the pulley structure 30. As a result, the flux field can flow through driven portion 32 of the pulley structure 30 to the ferromagnetic material of the pulley structure's clutch plate portion 36. The field magnetically affects the ferromagnetic material of the clutch disc 48 to attract the disc 48 axially towards the coil 70 and into its engaged position against the biasing of the tension straps 50. De-energizing the coil 70 discontinues the magnetic flux field and causes the clutch disc 48 to return back to its disengaged position under the resiliency of straps 50.

One advantage of using the one-piece flux carrier/mounting structure is that it allows a plurality of different pulley assemblies 8 to be manufactured using substantially identical coils 70. Specifically, the outer diameter of the pulley structure 30 can be increased or decreased as needed while still using a coil 70 of the same or substantially the same size and without increasing or decreasing the material thickness of the outer wall portion 32.

Thus, in accordance with a method aspect of the invention, there is provided a method of assembling a plurality of different power transmitting assemblies. The method includes the follow steps:

providing a coil inventory comprising a plurality of substantially identical coils;

providing a first pulley structure inventory of first pulley structures 30, the annular driven portions 32 of the first pulley structures 30 each having a first outer diameter at a driving element engaging surface thereof and a first inner diameter at an inner diametrical periphery thereof;

providing a second pulley structure inventory of second pulley structures 30, the annular driven portion 32 of the second pulley structures 30 each having a second outer diameter different from the aforesaid first outer diameter and a second inner diameter at the inner diametrical periphery thereof different from the aforesaid first inner diameter;

providing a first flux carrier/mounting structure inventory of first flux carrier/mounting structures 60 each formed from ferromagnetic material, the first flux carrier/mounting structures 60 each comprising (a) the integrally formed mounting portion 62 and (b) the integrally formed flux carrier portion 64 having a first radial extent selected to bridge the radially inward spacing between driven portion 32 of an associated first pulley structure 30 and an associated coil 70;

providing a second flux carrier/mounting structure inventory of second flux carrier/mounting structures 60 each comprising (a) the integrally formed mounting portion 62 and (b) the integrally formed flux carrier portion 64 having a second radial extent selected to bridge the radially inward spacing between the annular driven 32 of an associated second pulley structure 30 and an associated coil 70;

providing a clutch member inventory of clutch members 48;

fixedly mounting a coil 70 from the coil inventory to a first flux carrier/mounting structure 60 from the first inventory thereof;

assembling a first power transmitting assembly package including a first pulley structure 30 from the inventory thereof, the first flux carrier/mounting structure 60 with the coil 70 fixedly mounted thereto, and a clutch member 48 from the inventory thereof;

delivering the first power transmitting assembly package to the vehicle manufacturer or the manufacturer of the power driven device 10;

fixedly mounting a coil 70 from the coil inventory to a second flux carrier/mounting structure 60 from the inventory thereof;

assembling a second power transmitting assembly package including a second pulley structure 30 from the inventory thereof, the second flux carrier/mounting structure 60 with the coil 70 fixedly mounted thereto, and a clutch member 48 from the inventory thereof; and delivering the second power transmitting assembly package to the vehicle manufacturer or the manufacturer of the power driven device.

The order of the operations or acts listed above is not critical and the method of the present invention may be performed with these operations or acts in any suitable order.

The pulley packaging assembly packages may comprise a cardboard box, plastic bag or any other suitable packaging structure for packaging the components of the power transmitting assembly 8 together during delivery thereof.

Figure 2:
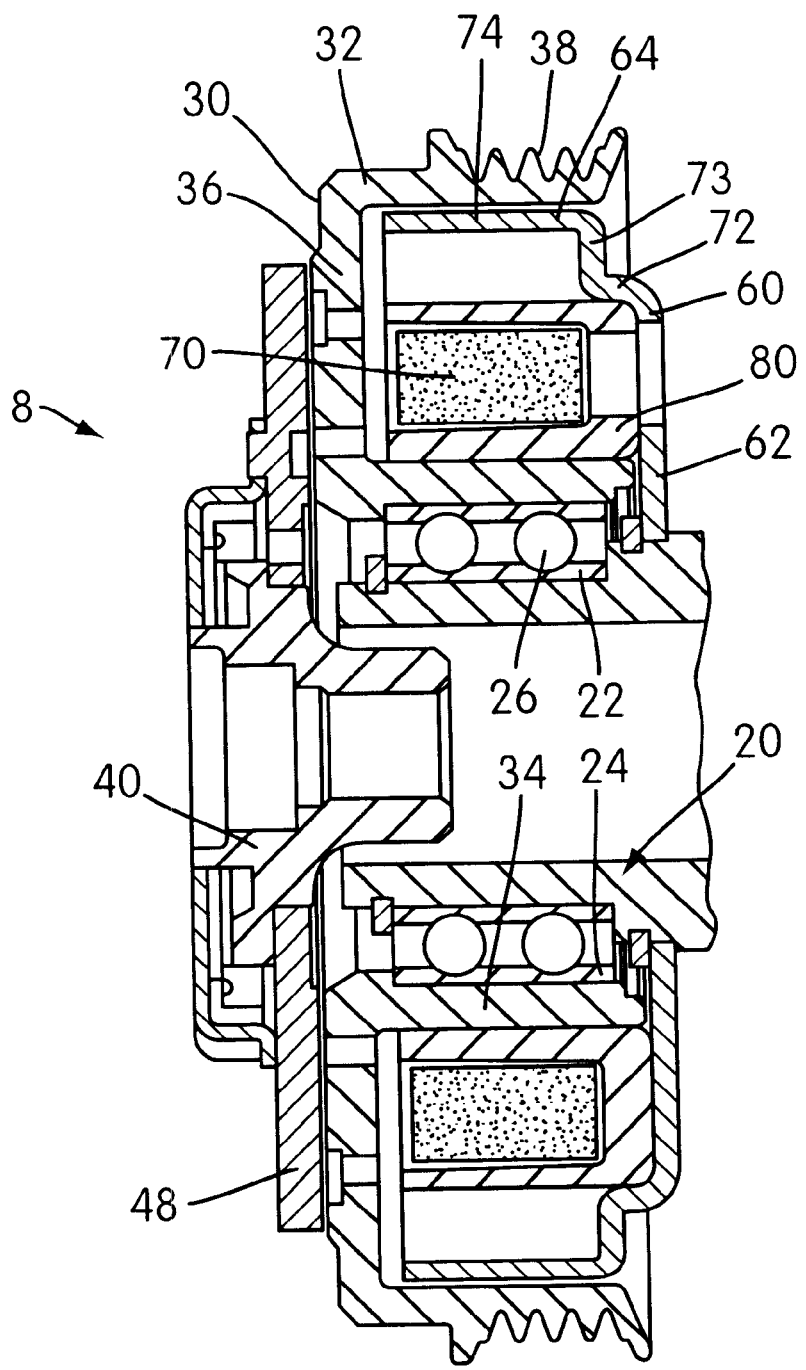
FIG. 2 is a cross-sectional view similar to FIG. 1 of a pulley structure of smaller diameter than the one in FIG. 1, but with a coil substantially identical to the coil in the power transmitting assembly of FIG. 1.

For example, in accordance with the method set forth above, the power transmitting assembly 8 in FIG. 1 may be considered the first power transmitting assembly 8 with the first pulley structure 30 and the first flux carrier/mounting structure 60 and the power transmitting assembly 8 in FIG. 2 may be considered the second power transmitting assembly 8 with the second pulley structure 30 and the second flux carrier/mounting structure 60.

Figure 3:
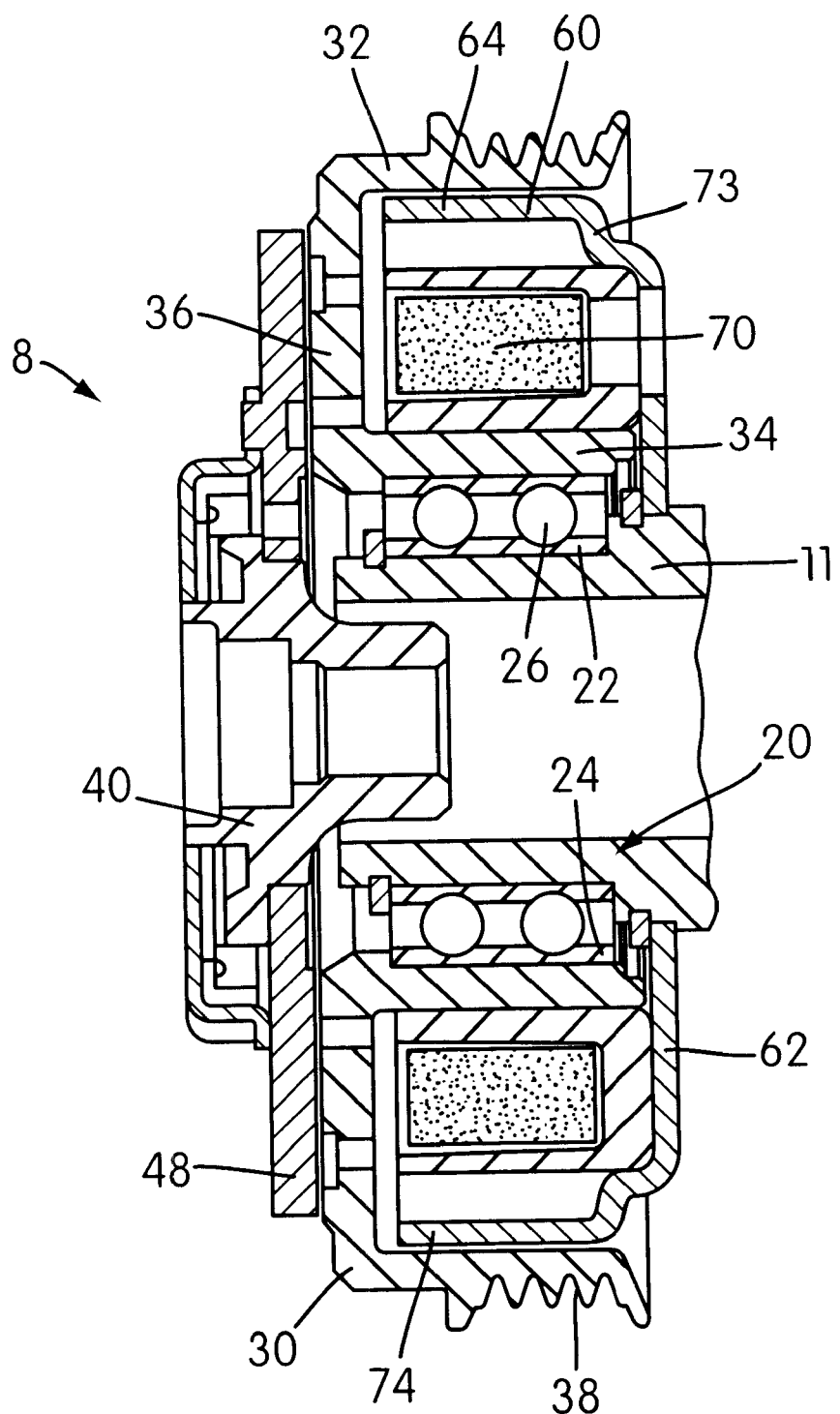
FIG. 3 is a cross-sectional view similar to FIG. 2 of a pulley structure of smaller diameter than the one in FIG. 2, but with a coil substantially identical to the coil in the power transmitting assembly of FIG. 2.
Figure 4:
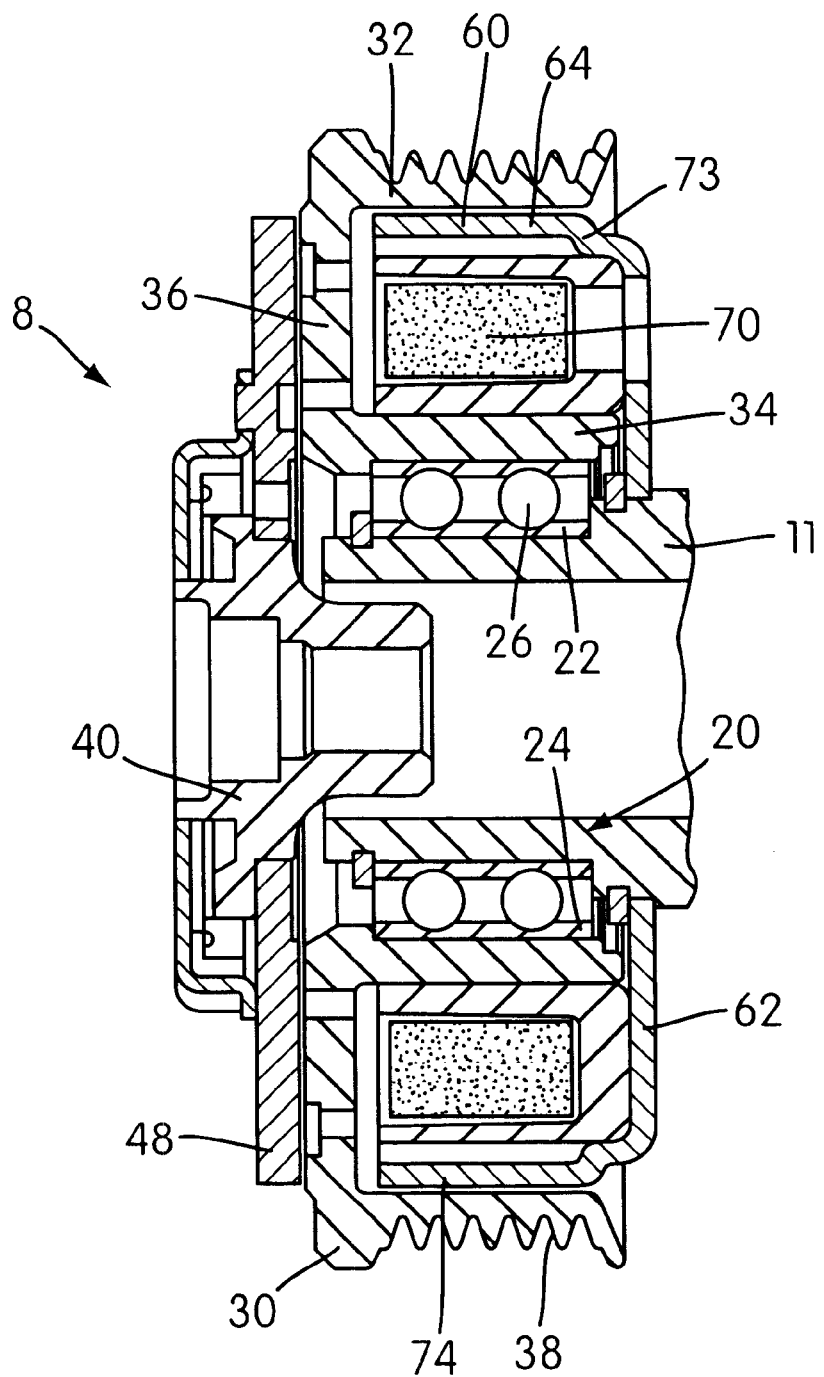
FIG. 4 is a view similar to FIG. 3 with a pulley structure of smaller diameter than the one shown in FIG. 3, but having a coil substantially identical to the above figures.
Figure 5:
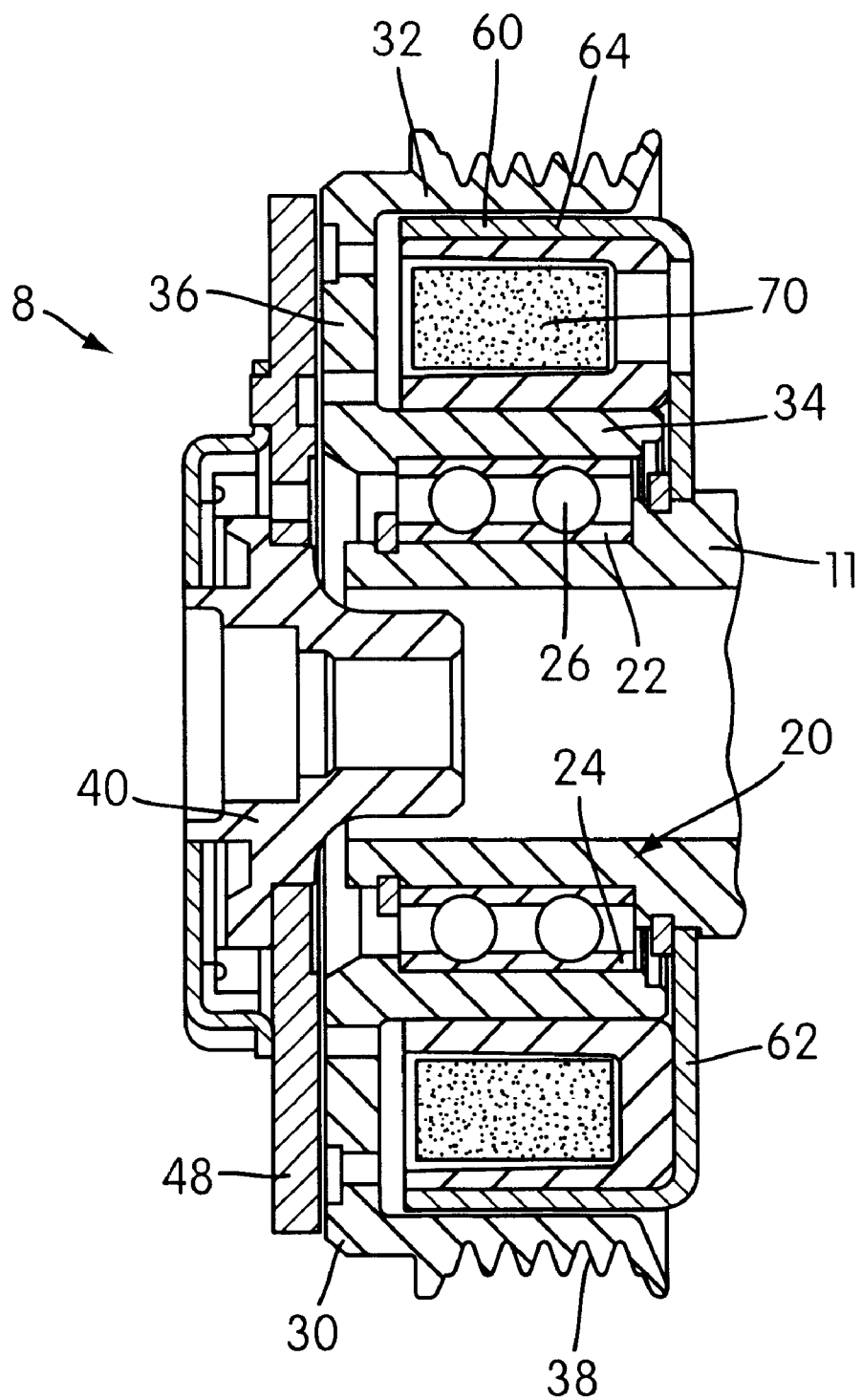
FIG. 5 is a view similar to FIGS. 3 and 4 with a pulley structure of smaller diameter than the one shown in FIG. 3, but having a coil substantially identical to the coils in the above figures.

Likewise, any number of different pulley assemblies 8 may be made in accordance with this method. For example, the power transmitting assembly 8 in FIG. 3 may be considered a third power transmitting assembly 8 with a third pulley structure 30 and a third flux carrier/mounting structure 60 and the power transmitting assemblies 8 in FIGS. 4 and 5 may be considered a fourth and fifth power transmitting assemblies 8, respectively, with fourth and fifth pulley structures 30 and fourth and fifth flux carrier/mounting structures 60.

Note that the first, second, third, fourth and fifth pulley assemblies each have pulley structures 30 with driven portions 32 having differing outer diameters and differing inner diameters, but use substantially identical or identical coils 70. Also, the thickness of the annular driven portions 32 of each of the pulley structures 30 between the inner and outer diameters are substantially the same. The use of the flux carrier/mounting structure 60 obviates the need for increasing the thickness of the driven portion to increase the outer diameter.

The belt 12 continually drives the pulley structure 30 relative to the stationary carrier/mounting member 60 and, the stationary coil 70. As a result, neither the carrier/mounting member 60 or the coil 70 contribute to the rotational, inertia of the power transmitting assembly 8.

Combining the flux carrier portion 64 and the mounting portion 62 into a single carrier/mounting member 60 reduces the number of components in the assembly 8 and hence the assembly's overall cost and complexity.

Thus, it can be appreciated that the objectives of the present invention have been fully and effectively accomplished. It is to be understood, however, that the foregoing preferred embodiment has been provided solely to illustrate the structural and functional principles of the present invention and is not intended to be limiting. To the contrary, the present invention is intended to encompass all modifications, alternatives, and substitutions within the scope of the appended claims.

What is claimed:

1. An electromagnetically actuated power transmitting assembly for installation on a power driven device of a motor vehicle to selectively supply power from the vehicle's engine system to the power driven device via an endless flexible driving element driven by the engine system, the power driven device having a rotatable input shaft that is selectively rotatable to supply power to said device, said power transmitting assembly comprising:

a cup shaped pulley structure mounted for rotation about the input shaft of said power driven device, said pulley structure having an outer annular driven portion for engaging said endless flexible driving element such that engine driven movement of said driving element rotates said pulley structure, said outer annular portion having ferromagnetic material along at least an internal diametrical periphery thereof to allow magnetic flux to flow therethrough;

a one-piece flux carrier/mounting structure formed from ferromagnetic material, said one-piece flux carrier/mounting structure comprising a mounting portion fixedly mounted to said power driven device and an annular flux carrier portion nested within the cup shaped pulley structure to allow said pulley structure to rotate relative to said flux carrier and to allow magnetic flux to flow therebetween;

an annular magnetic coil operable to induce a field of magnetic flux, said coil including a housing fixedly mounted in said carrier portion;

a selectively movable clutch comprising a magnetically attractable disc portion and a biasing member biasing said disc portion to a disengaged position, said clutch mounted such that energizing said coil induces a magnetic flux which overcomes said bias and selectively moves said disc portion from the disengaged position to an engaged position wherein said clutch couples said pulley structure and said input shaft for rotation and de-energizing said coil enables said biasing member to move the disc portion to the disengaged position de-coupling said pulley structure said input shaft to allow said pulley structure to rotate relative thereto.

2. A power transmitting assembly according to claim 1, wherein said one-piece flux carrier/mounting structure is stamped from ferromagnetic metal sheet material.

3. A power transmitting assembly according to claim 1, wherein said pulley structure is entirely formed from ferromagnetic material.

4. A power transmitting assembly according to claim 1, wherein said disc portion is mounted to move axially with respect to a rotational axis of said pulley structure between said engaged and disengaged positions thereof.

5. A power transmitting assembly according to claim 3, further comprising a ball bearing assembly having an inner race and an outer race, said inner race being fixedly mounted to said power driven device about said input shaft and said outer race having said pulley structure fixedly mounted thereto to thereby rotatably mount said pulley structure.

6. A power transmitting assembly according to claim 5, wherein said pulley structure comprises a radially outer annular wall providing said annular driven portion, a radially inner wall spaced from said outer annular wall and fixedly mounted to the outer race of said ball bearing assembly, and a radially extending wall interconnecting said inner and outer walls.

7. A power transmitting assembly according to claim 6, where said radially extending wall of said pulley structure provides a ferromagnetic clutch plate frictionally engaging said clutch member in the engaged position thereof to couple said pulley structure to said input shaft.

8. A power transmitting assembly according to claim 1, further comprising a clutch hub on which said disc portion is slidably mounted for movement between said engaged and disengaged positions thereof, said clutch hub fixedly mounted to said input shaft of said power driven device.

9. A power transmitting assembly according to claim 1, wherein said flux carrier portion has a radially outer portion to be disposed adjacent to and spaced from the internal diametrical periphery of said pulley structure driven portion, a radially inner portion engaging said coil, and a bridge portion extending generally radially between said outer and inner portions.

10. A method for making a plurality of pulley assemblies for installation on power driven devices of motor vehicles to selectively supply power from the vehicles' engine systems to the power driven devices via endless flexible driving elements driven by the engine systems, said method comprising:

providing a coil inventory of said stationary annular magnetic coils, each of said coils of said coil inventory being substantially identical;

providing a first pulley structure inventory of first pulley structures, said annular driven portions of said first pulley structures each having a first outer diameter at a driving element engaging surface thereof and a first inner diameter at the inner diametrical periphery thereof;

providing a second pulley structure inventory of second pulley structures, said annular driven portions of said second pulley structures each having a second outer diameter at a driving element engaging surface thereof different from said first outer diameter and a second inner diameter at the inner diametrical periphery thereof different from said first inner diameter;

providing a first flux carrier/mounting structure inventory of first stationary one-piece flux carrier/mounting structures each formed from ferromagnetic material, said first flux carrier/mounting structures each comprising a mounting portion to be fixedly mounted to said power driven device and a flux carrier portion having a first radial extent selected to extend generally radially between the internal diametrical periphery of the annular driven portion of an associated first pulley structure and an associated coil;

providing a second flux carrier/mounting structure inventory of second stationary one-piece flux carrier/mounting structures each formed from ferromagnetic material, said second flux carrier/mounting structures each comprising a mounting portion to be fixedly mounted to said power driven device and a flux carrier portion having a second radial extent selected to extend generally radially between the internal diametrical periphery of the annular driven portion of an associated second pulley structure and an associated coil;

providing a clutch member inventory of selectively movable clutch members;

mounting a coil from said coil inventory to a first flux carrier/mounting structure from said first flux carrier/mounting structure inventory;

assembling a first power transmitting assembly package including a first pulley structure from said first pulley structure inventory, the first one-piece flux carrier/mounting structure with the coil from said coil inventory fixedly mounted thereto, and a selectively movable clutch member from said clutch member inventory;

fixedly mounting a coil from said coil inventory to a second flux carrier/mounting structure from said second flux carrier/mounting structure inventory; and assembling a second power transmitting assembly package including a second pulley structure from said second pulley structure inventory, the second one-piece flux carrier/mounting structure from said second flux carrier/mounting structure inventory with the coil from said coil inventory fixedly mounted thereto, and a selectively movable clutch member from said clutch member inventory.

11. A method according to claim 10, wherein providing said first flux carrier/mounting structure inventory is performed by stamping said first flux carrier/mounting structures from sheet metal material and wherein providing said second flux carrier/mounting structure inventory is performed by stamping said second flux carrier/mounting structures from sheet metal material.

12. A method according to claim 11, wherein said first and second flux carrier/mounting structures are each stamped so as to have a radially outer portion to be disposed adjacent to and spaced from the internal diametrical periphery of an associated pulley structure driven portion, a radially inner portion to be engaged with an associated coil, and a bridge portion extending generally radially between said outer and inner portions.

13. A method according to claim 11, wherein said first and second pulley structures are provided such that a thickness of said driven portion of said first pulley structure as defined between said first inner and outer diameters thereof is substantially the same as a thickness of said driven portion of said second pulley structure as defined between said second inner and outer diameters thereof.

* * * * *